United States Patent [19]

Scholten et al.

[11] Patent Number: 4,802,523

[45] Date of Patent: Feb. 7, 1989

[54] BLANKET SHADE FOR WINDOW FRAME

[75] Inventors: Richard A. Scholten; Larry A. Mosteller, both of Cincinnati, Ohio

[73] Assignee: Richard A. Scholten, Cincinnati, Ohio

[21] Appl. No.: 513,372

[22] Filed: Jul. 13, 1983

[51] Int. Cl.[4] ............................................. A47H 23/00
[52] U.S. Cl. ................................. 160/354; 160/368.1
[58] Field of Search ........... 160/DIG. 16, 354, 368 R; 428/900, DIG. 16; 24/303

[56] References Cited

U.S. PATENT DOCUMENTS

| | | | |
|---|---|---|---|
| 3,133,324 | 5/1964 | Foreman | 20/52 |
| 3,161,932 | 12/1964 | Russell | 428/900 X |
| 3,679,505 | 7/1972 | Hinderaker et al. | 156/71 |
| 3,862,515 | 1/1975 | Baermann | 428/900 |
| 4,079,772 | 3/1978 | Klaenhammer et al. | |
| 4,397,346 | 8/1983 | Chumbley et al. | 160/84 R |

OTHER PUBLICATIONS

"Warm Window Shades Provide Efficient, Attractive Insulation", from The Cincinnati Enquirer, Sunday, Jan. 30, 1983 (p. E-4).

Primary Examiner—Ramon S. Britts
Assistant Examiner—David M. Purol
Attorney, Agent, or Firm—Wood, Herron & Evans

[57] ABSTRACT

A multiple-ply blanket window shade having magnetic strips embedded in the vertical edges of the shade and cooperating magnetic strips on the window frame. The magnetic strips are rubber-based, each having three poles running vertically and transversely spaced nominally on $\frac{1}{4}''$ centers, that is, magnetized on a magnetizing fixture with $\frac{1}{4}''$ wide poles.

3 Claims, 1 Drawing Sheet

BLANKET SHADE FOR WINDOW FRAME

This invention relates to an energy-saving blanket shade and window frame combination, and more particularly, to a blanket shade whose edges are adhered to the window frame by magnetic strips. The invention is applicable to accordion folded as well as roll-up type shades.

Typically, the blanket shades are formed of multiple plies of material such as woven inner and outer liners, thick non-woven internal liners and a central plastic film. While they are rather bulky, they do function effectively when adhered or sealed around their edges to a window frame to minimize the escape of heat through the window.

A preferred mode of sealing the shades to the window frame has been to insert, as by sewing, magnetic strips in the edges of the shade, the strips being separated from the window frame by one ply of material. Corresponding strips are formed along the vertical edges of the window frame. When the shade is dropped from a raised position, it is desired that the magnetic strips in the edges of the shade be attracted by the magnetic strips in the window frame so as to provide a reasonably tight seal around the edges of the shade. Unfortunately, the bulk of the material, as well as other factors to be discussed below, prevents the magnetic strips from mating properly with each other 100% of the time. As a consequence, the user must make adjustments by hand. In so doing, it is not uncommon for the user to run his fingers along the edges of the shade to press the magnetic strips together in a proper orientation. This results in grime appearing along the edges of the blanket.

An objective of the present invention has been to provide an improvement in the magnetic strips used to secure the shade to the window frame and thus to improve the reliability of the shade closing securely against the window frame when it is lowered.

To understand the improvement, it is necessary to understand the conventional approach to the use of magnetic strips in blanket shades. The magnetic strips have been ¼" by 1/16" in cross-section and as long as the window frame is high. These magnetic strips are a rubber-based material having ferromagnetic particles embedded in the rubber. These particles have been magnetized on alternate longitudinally-extending poles having a ⅛" spacing, that is, the spacing between poles has been twice the thickness of the strip. Two types of strips have been employed, the first being a four pole strip and the second being a five pole strip, one strip of the pair being magnetized N S N S N and the other strip of the pair being magnetized S N S N S.

These strips no doubt have been employed because the pull of one strip lying against the other is quite high, a one inch long strip having a 8.5 ounce pull.

In accordance with the present invention, a ¼" by 1/16" cross-section strip is provided with three holes, the pair having a S N S and N S N pole configuration with the poles having nominally a ¼" spacing, that is, having been magnetized on a fixture with ¼" pole spacing. This pole configuration has a significantly reduced pull when the strips are in face-to-face contact, that is, about a 6 ounce pull. Howevwer, there are at least two unexpected benefits derived from this pole configuration which results in a significantly improved aligning and attaching of the blanket to the window frame when it is lowered.

First, when the shade is spaced slightly away from the window as, for example, 0.160", the pull of the three pole configuration is more than twice that of the four or five pole configuration, thereby significantly improving the tendency of the shade to move into sealing engagement with the frame.

Second, there is a significantly improved alignment capability of the three pole configuration over the four or five pole configuration. For example, when coming together, if the magnetic strips of the three pole configuration are laterally misaligned as much as two-thirds the width of the strip, they will snap into precise overlying alignment. On the other hand, when the four and five pole configurations are brought close to each other with as little misalignment as one-fourth the width of the strip, they will snap together in a misaligned orientation.

The several features and objectives of the present invention will become more readily apparent from the following detailed description taken in conjunction with the accompanying drawings in which.

Figure 1:
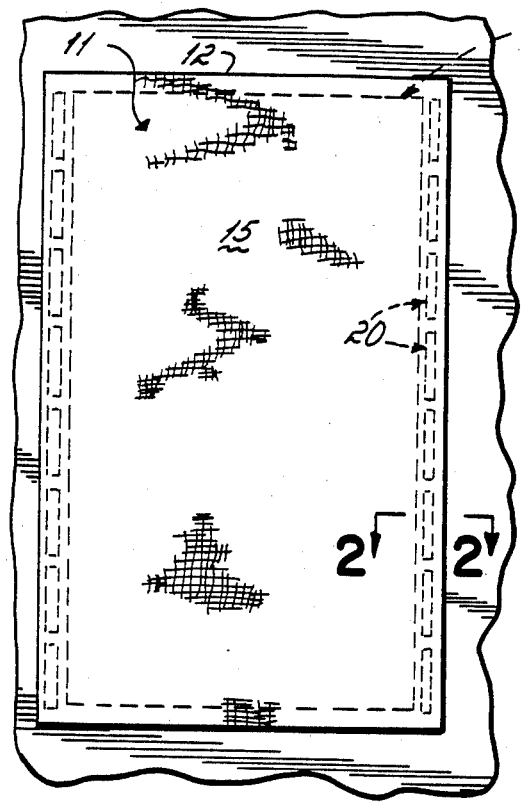
FIG. 1 is an elevational view of a blanket shade and window frame combination.
Figure 2:
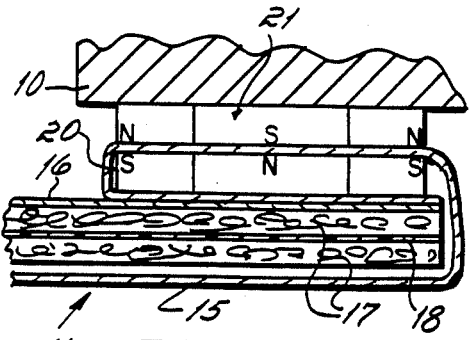
FIG. 2 is a cross-sectional view taken along lines 2—2 of FIG. 1.

As shown in FIG. 1, a window frame 10 is covered by a blanket shade 11 which is secured at its top 12 to the window frame.

In the illustrated form of the invention, the blanket shade has five plies of material. The inner ply 15 facing into the room is a printed woven fabric and the outer ply 16 facing against the window may be a plain woven fabric. Two interior plies 17 are thick, nonwoven, insulative material and a central ply 18 is a plastic film. Along each edge of the blanket shade is a movable magnetic strip 20 which is sewn into the fabric. Preferably, each magnetic strip is about 3½" long, the strips along the length of the fabric being vertically spaced from each other by about ½" so that the fabric can either be rolled or raised in an accordion fold.

A corresponding stationary magnetic strip 21 is secured to the window frame as by a pressure-sensitive adhesive. The magnetic strips are 1/16"×¼" in cross section and are magnetized to provide longitudinally-extending poles of an S N S and N S N configuration so that the opposite poles attract the strips. The poles are preferably nominally spaced ¼" transversely across the strip, ¼ inch being four times the thickness of the strip. That pole spacing could be as little as three times the strip thickness or as much as five times the strip thickness and still represent a significant improvement over the prior art. It has been observed that when the strips are brought into proximity with one another but laterally misaligned by as much as two-thirds the width of the strips, the magnetism of the poles will bring them into exact alignment.

Figure 3:
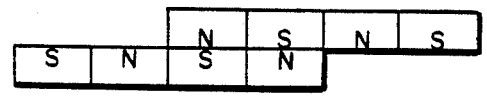
FIGS. 3 and 4 are diagrammatic cross-sectional illustrations of prior art magnetic strips conventionally employed in blanket shades.
Figure 4:
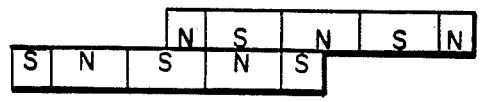

Prior art magnetic strips conventionally used with blanket shades are shown in FIGS. 3 and 4. In FIG. 3, a four pole configuration is illustrated. The cross section dimensions are the same as that of the invention. The poles, however, are on a ⅛" spacing. The two strips are identical, but care must be exercised to be sure that the window frame strip is reversed from that of the blanket shade strip so that opposite poles will be aligned when the strips exactly overlie each other. As shown in FIG. 3, the strips are misaligned but nevertheless attract one another because at least two poles of opposite polarity can be brought into alignment. If the strips are brought together with about a 25% misalignment, there is a greater tendency of the strips to finally come together in the illustrated misalignment than there is to come together in alignment.

The form of the prior art depicted in FIG. 4 is quite similar to that of FIG. 3. Again, the cross-sectional configuration is the same, being 1/16"×½". Five poles on ⅛" spacing are created in the ferromagnetic materials in the strips, the poles having a S N S N S and N S N S N configuration. The misalignment problem is the same for the five pole configuration as it is for the four pole configuration.

Figure 5:
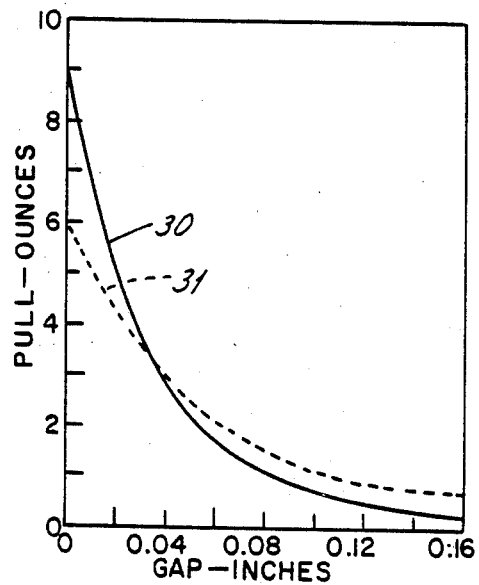
FIG. 5 is a curve illustrating the difference in pull versus distance of separation of the prior art strips contrasted to the strips of the present invention.

Pull tests were run to compare the prior art strips to the three pole strips of the present invention and that data is set forth in FIG. 5. The tests were run on strips 1" long. The solid line curve 30 depicts the pull versus distance apart of the magnetic strips having a ⅛" spacing, and the broken line curve 31 depicts the pull versus distance apart of the three pole with ¼" spacing.

Comparing the two curves, it can be seen that strips having ⅛" pole spacing have a substantially greater pull, 8.5 ounces, when there is no separation between the strips, the strips exactly overlying one another. The three pole strips with ¼" spacing, on the other hand, have a pull of only 6 ounces when the separation is zero.

Significantly, however, the three pole strips with ¼" spacing have a pull of about almost 0.7 ounces, whereas the strips with the ⅛" spacing have less than a 0.25 ounce pull at a distance of 0.160 inch spacing.

Thus, when the blanket is in close proximity to the window frame but not closed, there is a significantly greater tendency of the blanket with poles having a ¼" spacing to remain spaced from the frame. In contrast, the blanket shade with the ¼" pole spacing, when brought into proximity to the window frame, will much more reliably snap into sealing engagement with the magnetic strips on the window frame. Furthermore, if there is a substantial misalignment as the magnetic strips are brought into proximity with one another, there is practically no tendency of the three pole strips to come together misaligned, whereas the four pole and five pole strips will come together misaligned when their initial misalignment, when coming together, is as little as 25%.

Having described my invention, I claim:

1. A window and blanket shade combination comprising,
   a window frame,
   a stationary vertical magnetic strip on each side of said window frame,
   a blanket shade attached to the top of said window frame, and covering said frame,
   and a movable vertical magnetic strip disposed within said blanket shade along each edge thereof, said movable strips overlying said stationary strips when said shade is lowered,
   said strips each having only three longitudinally-extending poles spaced transversely across the strip, the nominal pole spacing being three to five times the thickness of the strip,
   one of said strips on each side of said frame having an N S N pole configuration, the corresponding movable strip having a S N S pole configuration, wherein each of the three poles in each of said strips is independent of the other, like poles in each strip being completely separated from each other by an unlike pole in the same strip.

2. A window and blanket shade combination as in claim 1 in which said strips are a rubber-based material having ferromagnetic particles embedded in the rubber,
   said strips being formed of a plurality of segments each about 3½ inches long, ½ inch wide and 1/16 inch thick.

3. In a window and blanket shade combination in which a window frame has stationary vertical magnetic strips on each side thereof and in which a blanket shade is suspended from the top of said window frame and has movable vertical magnetic strips along each edge thereof, said movable strips overlying said stationary strips when said shade is lowered to form with said window frame strips adhering pairs of strips, the improvement comprising,
   said strips being 1/16" thick and magnetized with a magnetizing fixture having ¼" pole spacing,
   one strip of each pair having only three poles in a longitudinally-extending N S N pole configuration spaced transversely across the strip, the other strip of said pair having only three poles in a longitudinally-extending S N S pole configuration spaced transversely across the strip such that like poles in each strip are completely separated from each other by an unlike pole in each strip.

* * * * *

UNITED STATES PATENT AND TRADEMARK OFFICE
CERTIFICATE OF CORRECTION

PATENT NO.   :   4,802,523
DATED        :   February 7, 1989
INVENTOR(S)  :   Richard A. Scholten & Larry A. Mosteller It is certified that error appears in the above-identified patent and that said Letters Patent is hereby corrected as shown below:

On face of patent, the Assignee should be:

-- Magnet Technology Inc., Cincinnati, Ohio --.

Signed and Sealed this

Fifth Day of June, 1990

Attest:

HARRY F. MANBECK, JR.

*Attesting Officer*        Commissioner of Patents and Trademarks